United States Patent Office 2,915,400
Patented Dec. 1, 1959

2,915,400

METHOD OF IMPROVING THE NUTRITIVE CONTENT OF EDIBLE AVIAN EGGS AND END-PRODUCT THEREOF

William Seltzer, Vineland, N.J., assignor to Vineland Poultry Laboratories, Vineland, N.J., a partnership No Drawing. Application February 13, 1956
Serial No. 564,853

6 Claims. (Cl. 99—113)

This invention relates to avian eggs as a food; of these the most common illustrations are the eggs of domesticated birds or fowl such as chickens, ducks and the like. More particularly, this invention relates to a method of treatment of avian eggs to improve their nutrient and therapeutic content and to the product of such method.

One of the objects of this invention is to provide a practical and efficient method for treating edible avian eggs to improve or increase the therapeutic functioning and nutrient content of the albumen or yolk or both as a food in the human diet. Another object is to provide a method of the just-stated character which will be economical to carry out on a large-scale or commercial basis and which will be reliable and dependable in action. Another object is to provide a method of the above-mentioned character by which inherent deficiencies in nutrient or therapeutic elements naturally contained in the egg, when considered in relation to nutrient or therapeutic requirements in the human diet, may be safely and reliably supplemented or made up, selectively, according to need, all without detrimentally affecting external appearance and salability of the resultant improved egg and without detrimentally affecting its capacity for usual or routine handling in commerce, including cold storage thereof.

Another object is to provide a practical and economical method for supplying to the interiors of edible avian eggs, selectively and quantitatively as may be needed, vitamins, minerals and other elements which are normally present in the eggs in amounts that are insufficient or inefficient or uneconomical for appropriate nutrient or therapeutic effects or values in the human diet. Another object is to provide a practical and economical method for supplying to the interiors of edible avian eggs, selectively and in quantity appropriate for human dietary or therapeutic needs, nutrient and therapeutic elements of kinds not normally contained in the egg. Another object is to provide a practical and reliable method of treatment of edible avian eggs to supply and distribute throughout the albumen or the yolk, or both, selectable amounts of nutrient or therapeutic elements which are absent from the albumen or yolk, or both, or which are quantitatively present in amounts that are deficient in relation to appropriate nutrient or therapeutic requirement thereof in the human diet.

Another object of this invention is to provide treated edible avian eggs, for the human diet, enhanced in nutritive or therapeutic properties by the addition to and distribution throughout the edible portion (albumen or yolk or both) of a nutrient or therapeutic element occurring naturally therein in quantity that is materially deficient in relation to a rational or reasonable nutrient or therapeutic requirement in the human diet. Another object is to provide treated edible avian eggs of the just-stated character in which there is also stored a surplus of the additive element in the non-edible portion of the egg (egg membrane or shell membrane or shell) for continuing supply or diffusion thereof to and throughout the edible portion of the egg.

In my copending application, Serial No. 362,947, filed June 19, 1953, and now issued as Patent No. 2,734,482, dated February 14, 1956, of which the present application is a continuation-in-part, I describe a process in which fertile eggs are treated without puncturing, in such a way that there is absorbed through the shells and the egg membrane substances which will affect the nature and growth of the embryo. These substances include sex hormones which may modify the sex of the chick and also substances such as enzymes, vitamins, minerals and anti-biotics, all of which may influence the growth of the embryo. In that patent it is pointed out that the added materials which are absorbed through the shell from a liquid solution or spray are held in storage by the shell and membranes and are drawn into the albumen and yolk of the egg by the growth of the embryo.

The present application is based upon my discovery that the same principle may be applied to edible (non embryonating) eggs and thereby the value of the eggs for human consumption may be increased. In this way, materials such as enzymes, vitamins and mineral salts can be caused to be absorbed through the shells of eggs and be stored in the shells and membranes of the eggs, and even through no growth is taking place in the egg, such substances apparently will be transmitted into the albumen and yolk by diffusion and dispersion. This action is rapid enough so that even in the course of a day or two a substantial increase of the absorbed substance may be noted in the albumen of the egg and yet there appears to be a storage factor in the shell and membrane so that an increase of the absorbed substance in the composition of the albumen and yolk may continue for a number of days.

As used herein the term "edible eggs" is intended to mean eggs in which no development of the embryo has taken place. Usually these will be non-fertile eggs, or if the eggs are fertile, it means eggs that are kept under non-incubating conditions or are used before embryonic development occurs. In other words, such eggs are non-embryonating eggs.

The high nutritive value of the avian egg as a food is well known and it is recognized that the egg greatly improves the diet of man and other animals.

The three most important elements of human diet are proteins, fats and carbohydrates; the avian egg is an excellent supplier of the first two and in that respect represents, of all animal products, the most efficient end-product resulting from the conversion of vegetable elements to essential animal dietary needs. Almost all of the known vitamins are present in the egg and the variety of minerals is substantial.

The presence of these vitamins and minerals in the avian egg is a recognized factor contributing to the importance and value of the avian egg as an element in the human diet, but the fact that many are present in only relatively small amounts, coupled with the fact of wide variation in the quantitative amounts thereof, has long been recognized as materially disadvantageous and as inherent nutrient deficiencies in relation to the needs of human diet.

The quantitative amounts of mineral elements and vitamins, in the avian egg, vary extremely; they have been found to vary with individual hens, with different flocks, from season to season, and other factors.

Valuable and important as is the avian egg in the human diet, its limitations and its quantitative deficiencies in certain of its contained elements have long been recognized and prior workers have resorted to inherently inefficient and uncertain methods dependent upon improved feeds, such as feeds weighted in content with the missing or low-concentration element, and have also resorted to methods of intravenous injection of the hens which again depend upon the variables involved in the hen's ability to transfer such elements to the egg.

It is also proposed to drill through or otherwise mechanically puncture the egg shell, and then by hypodermic needle inject vitamin-rich substances, which requires puncturing also of the shell membrane and egg membrane. This proposal, however, seems clearly to present obstacles and difficulties which appear insuperable. For example, puncturing the shell and its two adjacent membranes may induce quick spoilage; what is the effect of irremediable membrane punctures; how is the shell puncture to be closed and sealed; even rapid closure and sealing of the shell, in the effort to guard against spoilage, still leaves a "damaged" egg in the sense of structure, appearance and salability. The injected charge is localized and regionally concentrated. It is known that the yolk, enclosed in the vitelline-membrane which is elastic but delicate, varies in size and relative location. With a shifting yolk, what certainty is there against discharge from the needle into the yolk? What happens should the needle, in any event, puncture the vitelline membrane containing the yolk? Do yolk and albumen intermingle? These are some of the difficulties encountered, in this proposed injection method, not to mention its cumbersomeness and individual handling of the eggs or mechanical complications of drilling, needle entry control, sealing of the shell, etc.

According to features of my invention, I pursue none of such attempts and avoid effectively, in a simple, practical and economical manner, all of their difficulties. Consider, for example, niacin, one of the vitamins that constitute the vitamin-B complex. Its concentration in the egg contents is low, on the order of from 0.7 to 0.9 $\mu$g. per gram, or about 0.03 to 0.04 mg. per average egg (that is, a yolk weight of 15 gm. and an albumen weight of 29 gm.). The egg is not regarded as a worthwhile source of this vitamin for the human diet; it is recognized that a single egg contains as little as 0.2 percent of the daily requirement of an adult, per day. By my method I have succeeded in increasing the niacin content in the albumen alone as much as 60 times the amount naturally occurring in the whole egg, thus converting the egg to a material and significant source of this vitamin for the human diet.

Moreover, while niacin is recognized as rather stable, I have found not only good stability of the niacin added to eggs treated according to my method but also increase, over a period of time under temperature conditions comparable to cold storage, in the amount of niacin in the edible portion (here, in the albumen) of the egg. More specifically, over a period of 92 days following the processing of the eggs according to my method, eggs were withdrawn from time to time and the niacin content in the albumen determined, with the following results: after 1 day—1.56 mg.; 21 days—1.67 mg.; 38 days—2.24 mg.; 85 days—1.89 mg.; 92 days—1.64 mg. Furthermore, as shown in examples later given, I have found that the added niacin is present in more easily available form for absorption in the digestive tract in that a much greater proportion is, in the egg product of my invention, protein-free than is the case in unprocessed or control eggs. Breaking open such an egg, it is interiorly quite normal in appearance and its albumen and yolk are of normal texture and uniform throughout as to color and texture. There are no spottings or sites of localized action or content and the same is true when breaking it open after cooking, as after soft- or hard-boiling. Usual cooking procedures do not detrimentally affect its taste nor its niacin content. Externally, the egg is in appearance and structure quite normal; egg shell is intact, as are also the therewith closely associated shell membrane and egg membrane. Moreover, the vastly increased niacin additive is substantially uniformly distributed throughout the edible interior portions (albumen and yolk). Substantially similar effects and results are present when other additives are by my method incorporated with and into the egg, as shown by numerous other examples later set forth.

According to my invention, I first provide an edible liquid carrier having physical properties related to both the physical properties and coacting capabilities of the egg shell, the shell membrane and egg membrane and the physical properties of the additive substance or substance with which the normal or natural edible egg is to have its deficiencies materially and usefully remedied or alleviated. I am thus enabled to employ liquid carriers in the form of mineral oils, vegetable oils and like oily substances and fatty oils; in the form of various alcohols such as aqueous ethyl alcohol, isopropyl alcohol; and in the form of water, including salt-buffered solutions; in such edible liquid carriers, the additive may be carried in various ways, as by solution therein, suspension, emulsion, or the like. Various illustrations I set forth hereinafter.

Procedurally, after having made up a suitable quantity in suitable concentration, such as a liquid carrier and niacin with the niacin present, illustratively in solution, in concentration of 10 mg. per cc., I pour the resultant treatment liquid into a relatively shallow pan or container preferably of substantial area or expanse for the reception thereinto of a tray of suitable open-work construction adapted to carry, in closely associated relation, a suitable number of edible eggs, each preferably received in a seat or bottom opening with its peaked end downward, leaving the blunt end, which contains the air sac that forms between the shell membrane and the egg membrane, in uppermost position. For convenient manual manipulation, though my process is not so limited, and for purposes of illustration, the open-work tray may have a capacity of 100 eggs, or 144 eggs (which would be 12 dozen), conveniently arranged in a square 10 eggs or 12 eggs, respectively, to a side. With such an arrangement, set forth by way of illustration, such a group of eggs may be readily handled manually relative to the container-carried solution and let down into the latter, preferably as above noted with the peaked ends of the eggs downward, to a suitable depth and there retained for a suitable time interval, according to circumstances.

The shell of no egg of the group is drilled or punctured or patched; each egg of the group is wetted externally by the solution to substantially the same extent or amount, time and depth of letting the group of eggs down into the solution being related factors. For example, the eggs need not be immersed or submerged in the solution; they may be simply let down into the solution so that only a portion, from the peaked end up, of the external surface of the shell is wetted, say, to a depth of 1 or 1½ inches. For purposes of my method of treating edible eggs, a partial or entire egg-shell-surface wetting may take place. The greater the area of the external surface of the egg shell that is wetted, the less need be the time that the trayed group of eggs spends in the solution-carrying pan or container; this in turn is controllably variable according to the concentration of the additive or additives in the solution. These factors are not critical, for reasons later explained; wide flexibility is available. Also, temperature differences between the temperature of the egg as a whole and that of the solution may be used, for with the egg temperature somewhat higher than that of the solution, the wetting time may be lessened. No regard need be given to relative size or relative location of the yolk; there is no target-like point or region of the egg interior that has to be aimed at, as with the attempted injection method above mentioned.

The liquid-carried substance, the vitamin niacin in the above illustration, is with its carrier, upon wetting of the egg exteriorly, absorbed and initially held in the pores of the egg shell throughout which, even though only a part of the external shell surface is wetted, it becomes uniformly distributed, aided by the shell membrane which rests in close adherence to the inside surface of the shell and which has many minute channels or passages for diffusion therealong of the liquid carrier and the additive substance dissolved or otherwise carried therein, and against the internal surface of the shell membrane, rests, in close adherence thereto, the egg membrane which in general has minute channels or passages somewhat like those of the shell membrane and believed to be more numerous than those of the shell membrane. These membranes comprise minute fibres interwoven or held or cemented together and the passages therebetween or formed by them are of somewhat different character than the pores of the shell. Their passages are more uniformly distributed than are the pores of the shell. The inner or egg membrane contains the albumen which is in continuous contact therewith and to which the egg membrane presents a relatively smooth surface. Volumetric changes of the albumen and yolk are compensated for by change in volume of the air sac formed at the blunt end of the egg, between the shell membrane and egg membrane.

The niacin and its liquid carrier become relatively quickly taken up by the pores of shell and are soon spread, internally, throughout the entire expanse of the shell, particularly where the egg is only partially wetted externally, and throughout the expanse of the two contiguous membranes. This distribution apparently takes place by coaction between the pores of the egg shell and the structure of these membranes which are more or less fibrous and contain numerous and well-distributed pores and minute channels or passages. While the pores in the shell are probably principally directed transversely of or through the thickness of the shell and may thus provide passages for ingress of the liquid carrier from the outside of the shell to the inside, there is movement and distribution of the carrier liquid along and throughout the entire extent of the inner surface of the shell, effected apparently by way of the minute spaces, passages, or channels within the two membranes and also between the closely engaged inside surface of the shell and contiguous outer surface of the shell membrane; it coats the entire inner surface of the shell and it is also taken up in and by the passages or channels and pores of the membranes. This movement of distribution, when only a portion of the exterior of the shell is wetted, and the fact of more or less uniform distribution throughout the interior area or expanse of the shell can be demonstrated, in the laboratory, by including a suitable dye in the additive-carrying liquid and in that manner, by the color effect, trace and substantiate its movement and distribution. Such distribution can be aided in various ways, as is later set forth.

The amount of additive-carrying liquid so taken up per unit area of external shell surface and per unit of time and widely distributed peripherally relative to the yolk and albumen and over the relatively very large area and not insignificant volume of shell and also shell and egg membranes whose interstices and passages serve also as storage places, is readily measurable or determinable, as by taking the difference in volume of the treating solution before immersion or dipping of the egg and after immersion or dipping, and hence the desired concentration of the niacin or other additive is readily determinable in relation to the amount of niacin or other additive which it is desired to introduce into the edible portions of the egg. By my method, time-period of wetting, or the concentration of the additive in the liquid carrier, or both, may also be safely increased materially, in order also to store in the shell and the two adjacent membranes what is in effect a surplus or reserve and to achieve advantages later more fully described.

Where the liquid carrier is an oil or an oily or fatty substance, such as Sesame oil and other vegetable oils, edible mineral oils, and the like, there could arise objection were the edible egg to be completely submerged in in practicing my process, from the viewpoint of ultimate appearance and salability; a so-called oiled egg does not have the appearance of a newly-laid egg for the "bloom" of the freshly-laid egg is in effect replaced by a film of oil which to the buyer is readily noticeable. This undesirable effect is due in large measure to the fact that, while oil or oily substances readily enter or permeate the pores of the shell, they do not permeate the shell membrane and egg membrane; they are in effect locked in the pores of the shell and in whatever passages or channels or pores that exist between the contiguous surfaces of the shell and shell membrane. These difficulties or disadvantages I am enabled to overcome in several ways, employed severally or jointly.

For example, I may avoid complete submersion of the egg and a trayed group of edible eggs I may externally wet, preferably with the peaked ends downward, only partially, say to a depth of about 1 or 1½ inches for an appropriate time interval; in such case, I have found, the oil or oily substance, after entering the pores of the egg shell only throughout the limited and restricted peaked-end zone of the external surface area of the egg, moves or diffuses, apparently principally along the passages between the shell and the shell membrane, throughout the rest of the internal surface of the shell (that is, beyond the aforesaid zonal portion of external wetting) and enters the shell pores from the inside surface of the shell. For oil or oily substances alone, I am enabled thus, where desired, to effect satisfactory sealing, essentially from the interior surface of the shell, without detrimentally affecting external apperance and salability. In this manner, I have been enabled to "inner-coat" the shells of edible eggs and achieve satisfactory retarding effect on evaporation, a result sought-for in the production and preservation of edible eggs for human dietary consumption. To illustrate:

I have so "inner-coated" edible eggs by tip-immersion thereof to about 1" or 1¼", leaving by far the major portion of the external surface of the shell untouched by oil, using an edible oil, such as the mineral oil known commercially as "Klearol," and in one example I left them so tip-immersed all at room temperature, for an abnormally long period of time, about 65 hours, to show also that the amount of oil taken up in the manner above described is limited by the blocking action of the shell membrane and by the capacity of the shell pores to take up oil from the inside shell surface; by comparison with control eggs devoid of oil treatment and with which they were together refrigerated for 11 days at 38° F., I found that the control eggs lost about nine times as much weight than the "inner-coated" with both in a desiccator and about seven times as much weight with both groups exposed to the atmosphere. The data is set forth below, for groups averaging 5 eggs each:

|  | Loss in Weight (gms.) | Percent Loss |
| --- | --- | --- |
| "Inner-coated"; each in desiccator | 0.0964 | 0.158 |
| Controls; each in desiccator | 0.8758 | 1.476 |
| "Inner-coated"; exposed to atmosphere | 0.0360 | 0.057 |
| Controls; exposed to atmosphere | 0.2386 | 0.400 |

Such an edible oil or oily or fatty substance I can cause to serve as a carrier in the method of my invention and at the same time overcome the barrier effect of the shell membrane, by including in the mix or with the oily carrier a suitable surface-active agent, such as an alkyl aryl polyether alcohol (commercially available, for example, under the trademark "Triton X-45"). Various other surface-active agents may be employed and "Triton X-45" is set forth as illustrative. Another illustrative agent which is also readily available on the market is Tween 80. "Triton" compounds are disclosed in U.S. Patent No. 2,454,541 along with variations thereof, and related and generally similarly acting dispersion agents are described in U.S. Patents Nos. 2,454,542, 2,454,543, 2,454,544, and 2,454,545. Tween 80 is a polyethylene sorbitan mono-oleate and is one of a large group or family of related and generally similarly acting dispersion agents some of which are known by the trademark "Span" just as "Tween 80" is one of a group of Tween trademarked products. Of these and other surface-active or dispersing products, many are used in food products and in medicinal and pharmaceutical compositions. They are compounds in which one portion of each molecule is hydrophilic and another portion is lipophilic; some are more hydrophilic than others, and some are more lipophilic than others.

Such oily or fatty carriers, so containing a surface-active agent, and otherwise serving as a carrier particularly for oil- or fat-soluble additive elements such as vitamins A, D, E and K, are now no longer so effectively barred or blocked by the shell membrane and egg membrane; they not only, even on partial immersion of the edible eggs, readily distribute to the pores of the shell by direct entry thereinto from the exterior surface of the shell and by entry thereinto from the inside surface of the shell as above described, for peripherally distributed reception or deposit thereof but also their passage inwardly through these membranes is facilitated for dispersion in adequate quantity into the interior edible portions of the egg; the relatively considerable quantity that is also peripherally stored in the shell pores and by the two adjacent membranes becomes available for progressive and continued supply from the shell pores and from the two membranes to the albumen and and through the latter to the yolk, serving to increase, as time goes along, the vitamin, mineral or like additive dispersed to and throughout the albumen or yolk or both, or to thereby compensate for diminution in potency, where that may occur over substantial time intervals, of the initially dispersed additive.

Recurring to the niacin example above mentioned, which I shall call "Example 1," a suitable number of edible eggs were trayed in the manner above described and externally wetted with a niacin-containing carrier, of suitable niacin content; illustratively, the carrier liquid was water containing the water-soluble vitamin niacin in concentration or quantity of 10 mg. per cc. As above noted, the eggs may be partially immersed, preferably peaked end down; or wholly immersed or submerged with or without material temperature differential between the eggs and the solution. Time of such wetting may vary, as from about 2 minutes to about 10 minutes. For example, I have obtained good results by holding the eggs, initially warmed to about 50° C., in the solution, the latter at a temperature of about 18° C., for five minutes. The take-up of the liquid carrier and the egg additive therein, by the shell and shell membrane and egg membrane, proceeds relatively rapidly, for reasons above explained, and dispersion into the egg interior, that is, the albumen and/or yolk, commences immediately though it appears to proceed much more slowly but with relatively rapid effects quantitatively; this is apparently because of the relatively large, in fact relatively very large, peripheral area of initial storage or distribution (shell and the two membranes) and corresponding area of the egg membrane through which the carrier and egg additive enter the albumen. The movement from the inside surface of the egg membrane into the encompassed albumen is thus at a harmless relatively low rate per unit of that surface area, with no detrimental concentrations anywhere, thus slowly supplying the albumen with the liquid-carried additive for normal physical dispersion in direction inwardly of the life-less albumen; yet in the aggregate, the quantity of niacin supplied to and dispersed in and distributed throughout the albumen is significant and on a high order of magnitude.

This is apparent from the data already given above, as to this Example 1. The eggs, before processing according to my invention, contained a natural niacin content of about 0.03 to 0.04 mg. After wetting, they were placed in a refrigerator and kept at about 5° C. After 1 day, an adequate number were withdrawn and their average niacin content in only the albumen determined; it was found to be 1.56 mg., about 45 times as much as the entire edible contents of the egg contains naturally.

At succeeding intervals, earlier above recited, analysis of only the albumen of withdrawn eggs, over a period of 92 days, showed consistency of increase over the above 24 hour niacin content in the albumen of 1.56 mg., showing the continuity of supply thereof to the egg interior from the substantial peripherally distributed storage thereof in shell and shell membrane and egg membrane. At the end of 38 days, the niacin content was 2.24 mg., about 64 times as great (in the albumen, above) as is the natural niacin content of the egg. At the end of 92 days, the albumen contained 1.64 mg. of niacin, about the same as at the outset. However, no determination of niacin content of the yolk, in this example, was made, and it is probable that substantial quantities dispersed into the yolk; in that case, the replenishment of niacin to the albumen from the above-described peripherally distributed storage thereof is emphasized.

*Example 2.*—A suitable number of edible eggs were wetted, according to my invention, as were those of Example 1, but with pyridoxine, another vitamin of the vitamin B-complex, dissolved in water in concentration of 1 mg. per cc. Again, the eggs were stored at a temperature of about 5° C., over a period of 62 days. At the following times, a suitable number of eggs were withdrawn and the pyridoxine content of only the albumen of the eggs determined and averaged, with these results: after 5 days—1.14 mg.; 14 days—1.40 mg.; 28 days—1.17 mg.; 50 days—1.67 mg.; 62 days—1.01 mg. In the normal egg, pyridoxine content per egg, practically entirely in the yolk, is about 0.01 mg. The egg-product, in this Example 2, averages, over a 62 day period, 1.28 mg. of pyridoxine, in the albumen alone, and on that basis represents an increase 128 times as great as the natural pyridoxine content of the whole of the edible portions of the egg. Moreover, the example shows satisfactory maintenance of the additive content over an extended period of cold storage.

*Example 3.*—A suitable number of edible eggs were wetted, according to my invention, as were those of Example 1; the additive was thiamin, another water-soluble vitamin constituent of the vitamin-B complex. The liquid carrier employed was water and the thiamin was dissolved therein in concentration of 2 mg. per cc. Again the eggs were stored at a temperature of about 5° C. At intervals over a period of 44 days, end-product eggs were withdrawn and the thiamin content of only the albumen thereof determined with the following results: after 8 days—0.41 mg.; 27 days—0.27 mg.; 38 days—0.41 mg.; 44 days—0.67 mg. These data demonstrate (*a*) a manifold increase achieved in the thiamin content, averaging 0.44 mg. in the albumen alone compared to a naturally-occurring total thiamin content, essentially or wholly confined to the yolk and known to vary widely, in the egg of from 0.05 to 0.14 mg. and (*b*) good maintenance of the increased content over a substantial period of time; in fact the content on the 44th day was 0.67 mg. as compared to a content of 0.41 mg. on the 8th day, showing the unique effects of continued supply from the peripherially distributed liquid-carried thiamin in the shell and adjacent membranes, to the encompassed albumen. The average additive content on the 44th day (0.67 mg.) will be seen to be an increase on the order of about 700% over the average naturally occuring thiamin content.

*Example 4.*—A suitable number of edible eggs were wetted, according to my invention, as were those of Example 1; the additive was riboflavin, another water-soluble vitamin of the vitamin-B complex. The liquid carrier was water and the riboflavin content was 10 mg. per cc. The eggs were stored at about 5° C. At intervals up to 38 days, eggs were withdrawn and the riboflavin content of both albumen and yolk determined. After 10 days—0.14 mg.; 22 days—0.23 mg.; 38 days—0.33 mg.

In the laid egg, riboflavin occurs in both the albumen and yolk and the hen's egg is considered a pretty good source thereof for the human diet; however, it would require about 14 eggs daily to furnish an adult's needs. Moreover, the natural riboflavin content is quite variable and subject to numerous variable conditions and circumstances not unlike those mentioned above as to vitamin A. The mean content of hen's eggs of average yolk and albumen weights is known to be substantially as follows: the mean content in the yolk, from 0.06 to 0.12 mg.; in the albumen, from 0.04 to 0.14 mg.; of both yolk and albumen, from 0.10 to 0.26 mg. By comparison with the latter, the results of the above test (Example 4) show substantial increase over the natural riboflavin content and not only good maintenance thereof, but also substantial increase over a period of time, again showing continuing transfer of riboflavin from its pheripheral distribution in shell and membranes to, and diffusion into, the albumen and from the latter also into the yolk.

*Example 5.*—A suitable number of edible eggs were wetted in the manner as in Example 1; the additive was the mineral iron in the form of ferrous sulphate dissolved in water as the liquid carrier, at a concentration of 20 mg. per cc. As earlier noted above, the naturally-occurring iron in the hen's egg is essentially in the yolk, on the order of 2.0 mg., with very little in the albumen, only 0.3 mg. The above processed eggs were stored in a refrigerator at about 5° C. and, at intervals over a period of 76 days, eggs were withdrawn and the iron content in the albumen determined: after 1 day—0.14 mg.; 33 days—0.97 mg.; 76 days—0.54 mg. The increased iron content is significant, averaging 0.66 mg. as against 0.3 mg. Moreover, the continuing increase after the first day also shows the continuing transfer, to and throughout the albumen, from the initial substantially uniform peripheral deposit in the enveloping shell and membranes.

Concentration of the additive element in the liquid carrier can be relatively flexible, particularly in relation to time and extent of external wetting of the egg shell. This is shown by the following Examples 6 and 7.

*Example 6.*—Using a total immersion of the edible eggs for a time interval of five minutes, a suitable number of edible eggs were wetted in three groups with respectively different concentrations of additive element, in this case, pyridoxine, at concentrations of 1 mg. per cc., 5 mg. per cc., and 10 mg. per cc. These three groups were placed in a refrigerator at about 5° C. and during the period from 24 to 28 days after processing the pyridoxine contents of only their albumen portions were determined and found to be, respectively, 1.00 mg., 1.14 mg., and 3.60 mg.

*Example 7.*—In like manner, two groups of edible eggs were wetted as in Example 6 with liquid carriers carrying thiamin at respective concentrations of 2 mg. per cc. and 5 mg. per cc. and then kept at about 5° C.; during the period 24 to 27 days following, the albumen portions of the eggs of the two groups were analyzed and found to contain respectively 0.27 mg. and 1.23 mg.

Examples 6 and 7 show that, other factors being the same, the up-take by the shell and membranes of the desired additive is quantitatively controllable; thus, increasing the content of the additive in the liquid carrier results in increasing the amount of such up-take. These examples also show the relatively simple and virtually routine tests by which these relative quantitative factors may be readily determined, for any selected nutrient or therapeutic element the deficiency of which in the natural egg is to be remedied or alleviated.

I described above, and also in connection with Examples 1–5, the unexpected liquid capacity of the shell and the two shell membranes, the three forming in effect a reservoir of substantial volumetric capacity yet peripherally distributed relative to the edible interior portions of the egg, over a very large area or extent; not only is there immediate diffusion, from that reservoir, of the additive-carrying liquid to and throughout the albumen (see data, in Examples 1–5, as to increased content of additive in the albumen after 1 day) but also it retains such reserves that, unexpectedly, there is even increase, as time passes, in the additive diffused into the albumen (see data, in Examples 1–5, as to content in the albumen subsequent to first day). The unexpected character and magnitude of these aspects is further manifest when it is considered, for example, that the shell and the thereto tightly compacted tough shell and egg membranes are intended for physical protection; first, mechanical protection (via the shell, though that is strongly reinforced internally by the tough membranes, particularly the shell membrane); second, protection in the embryonating egg by providing respiration or necessary oxygen supply, via their permeability to air or gases; and third, since the albumen has a large content of water, the membranes in particular provide protection against loss thereof and serve to bar the liquid contents of the egg from escape, in both the inanimate egg and the embryonating egg. The inner membrane has its fibres closely cemented together and presents a smooth coating of albuminous cement-like material to the albumen which it envelops; the latter coating may thus stand as a barrier against material outward transfer of internal liquid contents. The large and continuing liquid-reserve holding capacity, to the other side of that coating, in the channels or passages of the inner membrane together with those of the outer or shell membrane and the pores of shell may be demonstrated, as in the following Examples 8 and 9, showing the decline, over substantial periods of time, of the reserve supply as the additive increases in the edible portions of the egg.

*Example 8.*—Edible hens' eggs were dipped under the conditions described in the preceding examples into a solution containing 5 mg. per cc. of pyridoxine. Each egg took up from 2.5 to 4.3 mg. of the vitamin. The end-product eggs were stored in a refrigerator at 5° C. and at intervals thereafter analysis of the pyridoxine content (*a*) of the shells (with their membranes), (*b*) of the albumen and (*c*) of the yolk was made. The percentage distributions in these various parts of the egg at various times after treatment are given in Table I. The data demonstrate that, with initial storage as above described, there is a clearly declining proportion of vitamin in the shell and its membranes, an increasing proportion in the albumen and a practically constant proportion in the yolk.

TABLE I

*The percentage distribution of pyridoxine in end-product eggs during storage in the cold*

| Time After Treatment | Percent In Shell And Membranes | Percent In Albumen | Percent In Yolk |
| --- | --- | --- | --- |
| 5 minutes | 45 | 42 | 13 |
| 3 hours | 31 | 53 | 16 |
| 20 hours | 21 | 66 | 13 |
| 2 days | 17 | 69 | 13 |
| 17 days | 16 | 72 | 12 |
| 35 days | 10 | 79 | 11 |

*Example 9.*—Edible hens' eggs were dipped under the conditions described in the preceding examples into a solution containing 5 mg. per cc. of riboflavin. Individual eggs took up from 0.7 to 1.4 mg. of the vitamin. The end-product eggs were stored in a refrigerator and the various parts analyzed for riboflavin content at intervals. The percentage distributions of the vitamin in the various parts at various times are presented in Table II. The data demonstrate clearly that with time the proportion of vitamin reserve retained in the shell and membranes declines while it increases in the edible portions of the egg.

TABLE II

*The percentage distribution of riboflavin in end-product eggs during storage in the cold*

| Time After Treatment | Percent In Shell And Membranes | Percent In Albumen | Percent In Yolk |
| --- | --- | --- | --- |
| 27 hours | 83 | 12 | 5 |
| 3 days | 77 | 19 | 4 |
| 23 days | 64 | 23 | 13 |

The above data and other disclosure set forth show the different character of the end-product, as compared to the natural state of the hen-laid egg, that results from the practice of my method; not only is the content of the otherwise deficient naturally-occurring element vastly increased in both albumen and yolk, but the otherwise inanimate (for the egg is not an embryonating egg) food substances (the edible portions—albumen and yolk) are in effect maintained in a physical though not physiological or chemical state of activity in that, over a long period of time commensurate with that not unusually occurring in the commercial handling of eggs (from laying to consumption as a food) such as periods of cold storage, an action of continuous infusion of the deficiently present element to and diffusion thereof throughout the edible portions of the egg takes place, from the composite reservoir structure of shell and the therewith tightly associated membranes; even this latter structure is different in the end-product egg, and uniquely so, from its natural state, for it now has new functions and properties not only as a depletable storage of reserve supply of the naturally-deficient element and its liquid carrier but also in that it partakes of a physical, though not physiological or chemical, action in effecting transfer thereof to the membrane-enveloped albumen and yolk.

There are further differences physically and structurally in the egg resulting from the practice of my method. It is found that the additive or supplied element, otherwise deficiently present in the laid egg, is infused or diffused to the edible portions of the egg in ratios quite different from those naturally occurring. This is illustrated in the following example:

*Example 10.*—Edible hens' eggs in suitable quantity were dipped under the conditions described in preceding examples into a solution containing 10 mg. per cc. of niacin. They were stored in the cold at about 5° C. along with untreated or control eggs from the same batch and twenty-three days later control and treated eggs were analyzed for niacin content in the albumen and yolk. In the control eggs the average niacin content was 0.06 mg. in the albumen and 0.026 mg. in the yolk; 31.3% of the vitamin was in the yolk. The albumen of the end-product eggs contained on the average 3.87 mg. and the yolk averaged 0.17 mg., of niacin; 4.2% of the vitamin was in the yolk.

There are still further differences in the end-product egg of my invention. In it the additives are made available not only in much increased amounts over those found naturally in the egg, but also in more easily available form; this I mentioned earlier above. In the case of the vitamins, for example, it is known that, in laid eggs, a certain proportion is bound to protein and another is free in solution in the non-protein portion of the edible substance. I have made comparative tests as to the protein-bound and protein-free concentration of certain substances in control (natural) eggs and in end-product eggs. The results show that in eggs resulting from treatment according to my method a much greater proportion is protein-free and therefore is more readily available for adsorption into the body of a person eating such eggs since the protein-bound vitamin must be free of its protein carrier in order to be absorbed from the digestive tract. This significant difference is illustrated in the following Examples 11 and 12:

*Example 11.*—Edible hens' eggs, in suitable quantity, were dipped under the conditions of the preceding examples, into a solution of pyridoxine containing 5 mg. per cc., and the end-product eggs were stored in a refrigerator at about 5° C. along with control eggs from the same batch, for 73 days. The albumen of the control and of the end-product eggs was separated into protein and non-protein fractions by ammonium sulfate treatment, and the two fractions were analyzed for pyridoxine content. In the control eggs on the average 0.24 mg. of the vitamin were found in the non-protein fraction and 0.08 mg. in the protein fraction; that is, 75% in the protein fraction. In the end-product eggs on the average 0.35 mg. of the vitamin were found in the protein fraction and 0.71 mg. in the non-protein fraction; that is, 32% in the protein fraction.

*Example 12.*—Edible hens' eggs, in suitable quantity, were dipped under the conditions of the preceding examples, into a solution of niacin containing 5 mg. per cc., and the resultant eggs were stored in the refrigerator at about 5° C. along with control eggs from the same batch. Analysis of the protein and non-protein fractions of the albumen were made as in the preceding example but at 3, 41 and 160 days of storage. The mean percentages of protein-bound niacin in the control eggs were at 3 days, 42.2, at 41 days 42.8, and at 160 days 24.4. Of the treated eggs, the mean percentages of protein-bound niacin were at 3 days 23.5, at 41 days 29.2, and at 160 days 13.9. In every instance a significantly much larger percentage of protein-bound niacin was found in the control or natural eggs.

Furthermore, several additives may be administered to the edible egg simultaneously, as by including them together in the liquid carrier and wetting the eggs therewith according to my method. It is found that, upon conclusion of the step of wetting, the take-up, by the shell and shell-membranes, of the several additives is in proportion to their respective concentrations in the liquid carrier, and that transfer thereof to edible portions of the egg then ensues. The following is an example:

*Example 13.*—Edible hens' eggs in suitable number were wetted as in previous examples with an aqueous solution of four of the essential B-vitamins, the liquid carrier containing them in the following concentrations: 10 mg. of niacin per cc.; 10 mg. of thiamin per cc.; 5 mg. of pyridoxine per cc.; and 5 mg. of riboflavin per cc. The average take-up per egg was determined immediately and was found to be 4.3 mg. of niacin, 4.3 mg. of thiamin, 2.2 mg. of pyridoxine, and 2.2 mg. of riboflavin. Analyses made after 24 hours disclosed the following distribution ratios of the respective substances between (1) the shell and the two contiguous membranes and (2) the albumen: niacin—92:8; thiamin—45:55; pyridoxine—46:54; riboflavin—86:14. These ratios also show the immediacy of diffusion to and into the albumen, significant quantitative transfers to the latter taking place in the inanimate egg during the first 24 hours; the continuity of transfer after the 1st day is shown by examples earlier above set forth.

Usual cooking procedures do not detrimentally affect the content of the additive substances, and the eggs have normal taste. Illustrative examples of boiling, frying or scrambling follow:

*Example 14.*—Edible hens' eggs in suitable number were wetted under conditions described in preceding examples with a solution containing 10 mg. of niacin per cc. The eggs were stored for eleven days in the cold at about 5° C. and the niacin content of the edible portion (albumen plus yolk) was determined on aliquots before and after scrambling and before and after boiling to hardness. The raw yolk and albumen contained on the average 0.073 mg. per cc.; after boiling the average content was 0.080 mg. per cc. and after scrambling 0.079 mg. per cc.

*Example 15.*—Edible hens' eggs in suitable number were wetted under the conditions described in previous examples with a solution containing 10 mg. of pyridoxine per cc. They were stored in the cold at about 5° C. and at intervals thereafter individual eggs were withdrawn and aliquots of various portions analyzed for pyridoxine content in terms of mg. per cc. before and after boiling and before and after scrambling. The determined contents at various times following treatment are set forth in Table III. These data demonstrate a substantially sustained content of the vitamin before and after cooking.

TABLE III

| Days After Treatment | 1 | 2 | 8 | 27 | 30 | 34 | 36 |
|---|---|---|---|---|---|---|---|
| Raw Albumen | 70.0 | 250.0 | 146.9 | 120.0 | 25.8 | 116.9 | 106.8 |
| Albumen After Boiling | | | | 150.0 | 110.7 | 168.4 | 42.7 |
| Raw Albumen Plus Yolk | 90.0 | 188.0 | 29.5 | 170.0 | 83.3 | 49.9 | 47.3 |
| Albumen Plus Yolk After Scrambling | 40.0 | 341.0 | 65.8 | 170.0 | 74.2 | 46.8 | 50.3 |

I noted above certain aspects of my invention, whereby, in the treatment of edible eggs as herein illustratively set forth, it is possible reliably to achieve quantitative control of the additive; for example, knowing the volume capacity of the average eggshell and membranes, I can then calculate the concentration of the additive, in the solution, and then proceed to dip or wet the shell eggs externally in a manner appropriate, in relation to the above-mentioned volume-capacity of the eggshell and membranes. Certain of the examples above given well indicate certain material aspects or factors whereby such quantitative control may be facilitated, but other tests of examples demonstrate, from other viewpoints, the practicability and substantial reliability of such quantitative control, as in Examples 16–22 about to be described.

In Examples 16–22 as tabulated below, the additives are pyridoxine, niacin, and ferrous sulfate, as respectively indicated in the tabulations. The tabulated data, in each example, is with respect to individual eggs. The test eggs in each example were warmed at the same time that the cuticle was removed from the shell exteriors, in each case by immersion in saturated ammonium sulfate solution for 5 minutes at 50° C.; the eggs were then rinsed for 30 seconds in running water at 50° C. to remove the ammonium sulfate whereupon the excess water was removed and the warmed eggs allocated to the respective tests represented by the above-mentioned Examples 16–22 for submersion, each for 5 minutes, in the solution of the respective example, all of the example solutions into which the eggs were to be received being at a temperature of 10 to 12° C. At the conclusion of the 5 minute interval of egg wetting, the eggs were removed from their respective solutions and excess solution allowed to drain from the eggs and to be collected. The pertinent data collected from these examples is as follows:

EXAMPLE 16

*Pyridoxine solution*

[Concentration: 5.0 mg./ml. distilled $H_2O$.]

| | Ml. sol. taken up by shell and membranes | Mg. $B_6$ in shell and membranes |
|---|---|---|
| Egg #1 | 0.110 | 0.56 |
| Egg #2 | 0.080 | 0.40 |
| Egg #3 | 0.076 | 0.38 |
| Egg #4 | 0.078 | 0.39 |
| Egg #5 | 0.086 | 0.43 |

EXAMPLE 17

*Pyridoxine solution*

[Concentration: 20 mg./ml. distilled $H_2O$.]

| | Ml. sol. taken up by shell and membranes | Mg. $B_6$ in shell and membranes |
|---|---|---|
| Egg #1 | 0.069 | 1.37 |
| Egg #2 | 0.072 | 1.44 |
| Egg #3 | 0.071 | 1.41 |
| Egg #4 | 0.061 | 1.21 |
| Egg #5 | 0.062 | 1.24 |

EXAMPLE 18

*Niacin solution*

[Concentration: 10.0 mg./ml. dist. $H_2O$.]

| | Ml. solution taken up by shell and membranes | Mg. niacin in shell and membranes |
|---|---|---|
| Egg #1 | 0.075 | 0.749 |
| Egg #2 | 0.091 | 0.939 |
| Egg #3 | 0.074 | 0.737 |
| Egg #4 | 0.071 | 0.707 |
| Egg #5 | 0.110 | 0.090 |

EXAMPLE 19

*Niacin solution*

[Concentration: 20.0 mg./ml. dist. $H_2O$.]

| | Ml. solution taken up by shell and membranes | Mg. niacin in shell and membranes |
|---|---|---|
| Egg #1 | 0.144 | 2.88 |
| Egg #2 | 0.097 | 1.94 |
| Egg #3 | 0.140 | 2.80 |
| Egg #4 | 0.049 | 0.98 |
| Egg #5 | 0.100 | 2.01 |

EXAMPLE 20

*Iron dipping solution*

[20.0 mg./ml. dist. $H_2O$.]

| | Area Egg Surface, Sq. Cm. | Mg. Iron in Shell and membranes | Mg. Iron/ Sq. cm. shell and membranes | Ml. Sol./ Shell and membranes |
|---|---|---|---|---|
| Egg #1 | 43.0 | 4.37 | 0.101 | 0.218 |
| Egg #2 | 38.5 | 2.98 | 0.078 | 0.149 |
| Egg #3 | 41.8 | 2.38 | 0.057 | 0.119 |
| Egg #4 | 41.7 | 2.11 | 0.051 | 0.105 |
| Egg #5 | 39.2 | 3.08 | 0.078 | 0.154 |

EXAMPLE 21

*Pyridoxine-dipping solution*

| | 5.0 mg./ml. | | | 20 mg./ml. | |
|---|---|---|---|---|---|
| | Egg Surface Area, Sq. Cm. | μg. Vitamin per Sq. Cm. | | Egg Surface Area, Sq. Cm. | μg. Vitamin per Sq. Cm. |
| Egg #11 | 41.7 | 13.4 | Egg #21 | 43.8 | 31.3 |
| Egg #12 | 39.5 | 10.2 | Egg #22 | 41.7 | 34.6 |
| Egg #13 | 41.0 | 9.2 | Egg #23 | 40.7 | 34.5 |
| Egg #14 | 41.5 | 9.4 | Egg #24 | 41.4 | 29.2 |
| Egg #15 | 42.2 | 10.2 | Egg #25 | 43.1 | 28.8 |

EXAMPLE 22

*Niacin-dipping solution*

| | 10 mg./ml. | | | 20 mg./ml. | |
|---|---|---|---|---|---|
| | Egg Surface Area, Sq. Cm. | μg. Vitamin per Sq. Cm. | | Egg Surface Area, Sq. Cm. | μg. Vitamin per Sq. Cm. |
| Egg #31 | 36.9 | 20.3 | Egg #41 | 42.4 | 68.0 |
| Egg #32 | 38.5 | 24.4 | Egg #42 | 37.4 | 51.8 |
| Egg #33 | 38.5 | 19.2 | Egg #43 | 43.5 | 63.7 |
| Egg #34 | 39.3 | 18.0 | Egg #44 | 39.6 | 24.6 |
| Egg #35 | 43.1 | 25.3 | Egg #45 | 39.0 | 51.5 |

The data derived from Examples 16–22 demonstrate that, given eggs of a standard grade and size and given also a solution containing the material to be administered to the eggs under similar conditions of temperature and time, the volumetric capacity of the eggshell and the two shell membranes is very constant within a quite narrow range. The variability in the data, in the several examples, of the individual eggs is substantially that which is ordinarily met with in biological material.

Comparing Examples 16 and 17, the left-hand column in each tabulation lists the volume of solution taken up by the shell and membranes and the general sameness of the amounts is at once striking, even though the concentration in Example 17 was four times that involved in Example 16; on the other hand, the right-hand columns give the quantitative amounts of the pyridoxine found in the shell and membranes and, quantitatively, that is greater for Example 17 than it is for Example 16 in substantially the ratio of the concentrations. Again, the amounts of pyridoxine found in the shell and the membranes of the respective eggs of Example 16 are very closely of the same order of magnitude and, in Example 17, the substantial sameness quantitatively of the pyridoxine found in the shell and membranes of the individual eggs of Example 17 is equally striking.

The data for Examples 18 and 19, where niacin solutions of respectively different concentrations were employed, follow the above-described quantitative pattern as does also indicated variability.

In Example 20, the solution employed contained ferrous sulfate at the concentration set forth, and the data again indicates the consistency of the quantitative factors and also substantial consistency of relation between various of these quantitative factors.

Example 21 really sets forth two examples inasmuch as for eggs there numbered 11–15 the pyridoxine concentration is one-quarter that for eggs #21–25, and the same is true of Example 22 for the niacin concentration for eggs #41–45 is twice that for eggs #31–35. In these examples, the surface areas of the respective eggshells were recorded and the uptake of the several additives at different concentrations as indicated has been related in each case to a unit area of shell and membranes. Again the same pattern quantitatively appears as was described above in connection with earlier examples.

The substantial consistency of volumetric capacity of the eggshell and the adjacent shell membrane and egg membrane may be, as earlier indicated above, substantiated by other means, as by submersion of eggs in a solution of a suitable radio-active material, such as in Test 23 of which the pertinent data is tabulated below, as follows:

TEST 23

*Recovery of radio-active benzoic acid from egg shells and membranes*

Dipping solution _____ Radio-active benzoic acid.
Concentration of sol _____ 3.0 mg. benzoic acid per ml. distilled water.
Temperature of sol _____ 15° C.
Time of immersion _____ 10 seconds.
Temperature differential ___ 9° C.

| | Vol. sol. taken up by shell and membranes (ml.) | Surface of egg (Sq. cm.) | Mg. Benzoic Acid per egg shell and membranes | Micrograms Per Sq. cm. of shell and membranes |
|---|---|---|---|---|
| Egg #1 | 0.15 | 38.5 | 0.45 | 11.70 |
| Egg #2 | 0.14 | 37.0 | 0.41 | 11.10 |
| Egg #3 | 0.116 | 36.5 | 0.35 | 9.60 |
| Egg #4 | 0.149 | 36.5 | 0.44 | 12.10 |
| Egg #5 | 0.109 | 39.1 | 0.328 | 8.40 |

For the respective eggs identified at the left, the first column records the respective volumes of the radio-active solution taken up by the shell and its adjacent membranes; the next column gives the respective surface areas of the respective shells of the eggs for the amount of take-up, other conditions being the same, would vary with the available eggshell surface area, and the next column of figures (second from the right) gives the quantitative amount of benzoic acid taken up by the respective shell and membrane units of the respective eggs as deduced from the amount of radio-active material found in the respective eggshell and membrane units, by counter, such as a Geiger counter; the figures in this column also show outstanding consistency, a consistency that further substantiates the reliability of quantitative control, according to my invention, as earlier indicated.

Thus, these additional data demonstrate further that the volumetric liquid uptake capacity of the eggshell and its associated shell membrane and egg membrane is very constant for eggs taken from the same standard grade and size. Eggs are commercially graded, as is known; hence for eggs of the same grade and size and subjected to the same commercially practicable temperature or pressure and time conditions for taking up the solution of administration, close or reliable quantitative equality of liquid uptake follows. The data so far disclosed herein shows that there is some variation from egg to egg but the order of magnitude of such variability is similar to that ordinarily met with in biological material. Scrutiny of the data will show, it is believed, that calculation of coefficients of variation gives values that fairly represent the type of variability met with in biological measurements, indicating that, from egg to egg, the uptake of the liquid-carried material by the eggshell and its adjacent shell membrane and egg membrane is marked at the most by variation not greater than ordinary biological variation.

Accordingly, as shown by the many examples above set forth, uniformity or equality of liquid-takeup, quantitatively, by the eggshell and internally adjacent shell membrane and egg membrane of the eggs of the same standard grade and size can be depended upon, while uniformity or equality of amount of nutrient or therapeutic additive supplied to the eggs by way of the liquid-carrier is reliably assured by having it present in the carrier at the selected concentration; and where it is desired or necessary to depart from any selected quantitative uniformity or equality of additive per egg, the concentration of the additive in the liquid-carrier is correspondingly changed. In this latter connection, intentional quantitative change may also be effected as by lessening the area of the eggshells as they are wetted by the additive-carrying-liquid or lessening the time of immersion wholly or in part, or some other factor such as temperature differential as would affect rate of uptake. The time element involved is relatively short and may vary with such factors as just mentioned; principally, the eggshell pores and the many and much smaller interstices of the two adjacent membranes are relatively rapidly charged with the liquid-carrier and its additive, it appearing that the structure of the inner wall surface of the inner membrane acts materially to retard movement there through, wherefore liquid carriers such as water, alcohols and the like and oily carriers with surface-acting agents as earlier described, with their respective additives, tend to be somewhat held back for peripheral storage in the cell pores and the spaces within the membranes, for subsequent continuous inward flow for dispersion throughout the albumen and other interior edible parts of the egg. The long-lasting effects thus achievable are illustrated in some of the above examples.

In the foregoing disclosure, as well as in the numerous examples above set forth, I have shown and emphasized that the primary criteria for the selection of liquid carrier and the form or substance of the egg additive are essentially their physical properties in relation to each other and in relation to the physical properties of the edible egg structure or structural components thereof, to the end that their respective coactions, well illustrated in the numerous examples given above, be essentially physical in nature as distinguished from involving physiological or chemical interactions; to these criteria should be added the property of edibility, that is, compatability with the digestive and absorbtive system of the human body, with nutrient or therapeutic properties, or both, in the end-product egg, enhanced over those of the natural or newly-laid egg. Thus, the liquid carriers that I employ, including oils or fatty substances with surface-active agents, are so compatible, being present in only relatively minute quantities, and the additives, selected principally from those in which the natural egg is deficient, are chemically inert with respect to the carrier liquid and chemically inert with respect to the egg structure and its contents, with the edible albumen portion or yolk portion, or both, of which it is miscible or becomes commingled, largely, as I now understand it, by diffusion or dispersion. Desirably, the additive in which the natural egg content is deficient is brought into and distributed throughout the albumen or the yolk, or both, without any or material chemical interaction, for in that manner the additive is supplied to the otherwise dificient or lacking natural egg in free, or substantially free, form and made more readily available, when the end-product egg is taken as a food, for actions and coactions in the digestive and absorbtive system.

In this latter connection, by way of example, my method may be employed to remedy the copper deficiency in the natural egg in relation to the metabolism of iron in hemoglobin formation; I noted earlier above that the natural copper content of the edible egg is essentially unavailable for this purpose because it is combined with sulphur of the egg, in the form of copper sulphide. Copper salts, such as copper chloride, are dissolved in water as the liquid carrier, in suitable concentrations to provide the desired up-take upon wetting, for diffusion and dispersion of the copper salt to the edible egg interior wherein it becomes retained largely in the albument portion because of the large water content of the latter. Quantitatively, the copper salt may be proportioned in relation to the fairly substantial known natural iron content of the egg. Or, where the natural edible egg has its iron content increased according to my method, as in Example 5 above, the copper salt concentration in the liquid carrier is proportioned appropriately to the sum of the natural iron content and the additive iron. Both the iron salt and the copper salt may be dissolved in the same liquid carier for simultaneous administration to the eggs. The resultant eggs, in the human diet, thus provide not only a substantial iron content in each, but also an accompanying appropriate readily available copper content for conversion of the iron into hemoglobin, thus greatly lessening the complication or need of other foods, in the diet, for the supply of copper for this purpose.

In the above, I mentioned the exceedingly small iodine content normally occuring in the edible egg, and the wide variability, with numerous factors, of the quantitative content of iodine, as well as prior attempts to improve such content by reliance upon the organism of the hen in transfering iodine to the egg. Because of my method, such cumbersome, inefficient, and uneconomical attempts and their variability of result need not be relied upon, and far superior and highly consistent results in increasing the iodine content of natural eggs are achieved. Iodine itself or any suitable iodine salt, such as sodium iodide, potassium iodide, or other iodides, with a suitable liquid carrier, such as a solvent therefor, may be used, according to my method, in preparing the solution with which externally to wet the edible eggs, with the iodine content of the solution in appropriate concentration in relation to the time and external surface area of wetting, to give the desired initial iodine up-take by the shell and shell membranes. This up-take can be, quantitatively far in excess of the very small amount of iodine, on the order of 0.004 to 0.01 mg., naturally contained in the egg, mainly in the yolk. Thus, for example, the iodine concentration can be such that the iodine up-take per egg is on the order of 0.04 mg. of which a substantial proportion promptly diffuses to the edible portions of the egg interior, principally the albumen, with the remainder retained in the eggshell pores and the two membranes as a depletable reserve supply to the albumen, over a substantial period of time, as illustrated in other examples given above. The quantitative selection, per egg, of the additive iodine element is made in relation to the daily requirement of an adult human, that being 0.1 mg., and the illustrative quantity above set forth may be increased or decreased according to the number of end-product eggs which it is desired to include in the daily diet.

In like manner, and again in relation to what is a rational or reasonable quantity for a reasonable number of eggs per day in the human diet to provide the requirement therefor, the content of other "trace" minerals, such as bromine, manganese, zinc and the like, may be increased according to my invention, and the same may be done with respect to other minerals, such as calcium or phosphorous, which are normally present, as is also iron in Example 5 set forth above, in quantities materially greater than the "trace" minerals. Illustrative salts or compounds thereof, for these purposes, may comprise zinc glycerophosphate; ferrous sulphate; ferric ammonium tartrate; manganese sodium citrate; calcium lactate; calcium gluconate; cupric gluconate.

In generally like manner, particularly by way of the quantitative control above described, other substances may be safely and economically added to the interior edible content of the egg; the avian egg contains germicides and antibacterial substances and these may be supplemented according to my process and the end-product materially improved. For example, lysozyme, largely in the albumen, is an enzyme known and recognized as being primarily effective because of its antibacterial and germicidal properties. According to my method, it may be added in a suitable carrier or its content enhanced by following my method and utilizing a weakly acid buffer in the carrier solution. For example, the enzyme lysozyme, a natural anti-biotic agent present in the egg albumen, is stable in acid solutions so that it may be retained as an active agent without chance of decomposition by using, for the wetting solution of my invention or by inclusion therein, a weekly acid buffer. This is a mixture containing 5.7 cc. of 1/10 normal sodium hydroxide plus 50 cc. of 1/10 mono potassium phosphate (KH$_2$PO$_4$) brought to 100 cc. as an example of a buffer which would stabilize the acidity at a pH of 6.0. For optimal action of this enzyme an 0.5% sodium chloride solution has been used. It is possible by my process to adjust the egg albumen concentration of sodium chloride to this level. The normal sodium-chloride concentration in egg albumen is approximately 0.15 percent. By using a treating solution containing sodium chloride at 0.5 percent concentration or higher it is possible in accordance with my method to bring up the sodium-chloride content of the egg albumen.

The desirability of iron as an element in the edible content of the egg is well recognized; in an earlier example given above, I illustrated the enhancement, according to my invention, of the iron content of the egg. It is also known that iron, in the egg, promotes the growth of certain bacteria. Desirably, therefore, I may add, according to my methods, to the interior of the egg, a preservative with a suitable liquid-carrier and such addition I may make concurrently with the addition to the egg interior, according to my method, of supplemental iron. The preservative may be any suitable edible germicidal, bactericidal, or anti-biotic substance. It is known that the albumen can stop certain bacteria and that it does so by making iron unavailable; by adding a preservative, according to my method, that is a bactericide for such bacteria, the natural iron content need not be made unavailable by the albumen and it is probable that iron, if also added according to my method, is in effect maintained in more readily available form. An illustrative preservative, according to another example which I may call Example 24, consisted of methyl paraben to which, at the concentration noted below, a quantity of edible eggs were immersed in the preservative solution, with the solution 5 to 8° below room temperature (23° C.) each for the same short time interval, according to my method, and then the eggs were stored, along with some control eggs, in an incubator at 37° C. and all were checked, for signs of spoilage, at least once weekly from the date of initial treatment. If in any group there was any odor present, the odoriferous eggs were selected for bacterial counts along with one other egg selected at random from that group, and two eggs were taken for bacterial counts from each of such other groups as indicated no spoilage. The first spoilage occurred in the controls 35 days after storage in the incubator. The pertinent data is tabulated as follows:

EXAMPLE 24

| No. of days after storing | Organisms/ml. egg | |
|---|---|---|
| | Methyl Paraben, 1 mg./100 ml. H$_2$O | Controls |
| 35 | | 10,000 |
| 40 | | 25,000 |
| 47 | 100 | 18,000 |
| 54 | | 22,000 |
| 63 | | 47,000 |
| 78 [1] | 200 | |

[1] On the 78th day all the eggs had dried, without sign of spoilage.

In view of all of the foregoing, the practicing of my invention according to the principles above disclosed and illustrated in the many varied examples set forth will now be clear.

Furthermore it will be seen that, by this invention, many thoroughly practical advantages are achievable in an efficient and economical manner and that the various objects above set forth or indicated are successfully achieved.

As many possible embodiments may be made of the mechanical features of the above invention and as the art herein described might be varied in various parts, all without departing from the scope of the invention, it is to be understood that all matter hereinabove set forth is to be interpreted as illustrative and not in a limiting sense.

I claim:

1. A process for improving the natural nutrient content of edible non-embryonating whole avian eggs whose shell and membrane are in their naturally-occuring condition which comprises wetting the shell of the egg with a composition consisting essentially of an inert liquid carrier and an edible enhancing substance and causing the composition to enter the magma of the egg through the pores of the shell and membrane without rupturing the same and without injuring the egg magma.

2. A process in accordance with claim 1 in which the composition is caused to enter the egg by the fluid pressure of the composition.

3. A process in accordance with claim 1 in which the egg before being wet with the composition is brought to a temperature higher than that of the composition but not in excess of 50° C. in order to cause the composition to enter the egg.

4. A process in accordance with claim 1 in which the enhancing substance is one that is naturally-occurring in avian eggs.

5. A process in accordance with claim 1 in which the enhancing substance is a vitamin.

6. A whole avian egg prepared in accordance with the process of claim 1 whose shell and membrane are in their naturally-occurring condition and whose natural nutrient content is improved by an enhancing substance.

References Cited in the file of this patent

UNITED STATES PATENTS

| 1,635,843 | Hofmann | July 12, 1927 |
| 2,568,917 | Gray | Sept. 25, 1951 |
| 2,595,808 | Napper | May 6, 1952 |
| 2,676,105 | Sherman et al. | Apr. 20, 1954 |